US010820383B2

(12) United States Patent
Nordh et al.

(10) Patent No.: US 10,820,383 B2
(45) Date of Patent: Oct. 27, 2020

(54) CONTROL OF MICROWAVE SOURCE EFFICIENCY IN A MICROWAVE HEATING APPARATUS

(71) Applicant: WHIRLPOOL CORPORATION, Benton Harbor, MI (US)

(72) Inventors: Ulf Nordh, Norrkoping (SE); Hakan Carlsson, Norrkoping (SE); Olle Niklasson, Finspong (SE); Fredrik Hallgren, Kolmarden (SE)

(73) Assignee: Whirlpool Corporation, Benton Harbor, MI (US)

( * ) Notice: Subject to any disclaimer, the term of this patent is extended or adjusted under 35 U.S.C. 154(b) by 330 days.

(21) Appl. No.: 15/862,890

(22) Filed: Jan. 5, 2018

(65) Prior Publication Data
US 2018/0132311 A1    May 10, 2018

Related U.S. Application Data

(63) Continuation of application No. 13/331,959, filed on Dec. 20, 2011, now abandoned.

(30) Foreign Application Priority Data

Dec. 21, 2010  (EP) .................................... 10196108

(51) Int. Cl.
*H05B 6/64* (2006.01)
*H05B 6/68* (2006.01)
(Continued)

(52) U.S. Cl.
CPC ............. *H05B 6/705* (2013.01); *H05B 6/688* (2013.01); *Y02B 40/143* (2013.01)

(58) Field of Classification Search
CPC .......... H05B 6/705; H05B 6/688; H05B 6/64; H05B 6/6411; H05B 6/6402;
(Continued)

(56) References Cited

U.S. PATENT DOCUMENTS 4,711,983 A    12/1987 Gerling
4,866,346 A     9/1989 Gaudreau et al.
(Continued)

FOREIGN PATENT DOCUMENTS

EP        1643641 A2    4/2009
EP       21827742 A1    5/2010
(Continued)

OTHER PUBLICATIONS

European Patent Applicaiton No. 10196108.4, filed Dec. 21, 2010, Applicant: Whirlpool Corporation. European Publication No. 2469975A1, published Jun. 27, 2012.

*Primary Examiner* — Quang T Van
(74) *Attorney, Agent, or Firm* — McGarry Bair PC (57) ABSTRACT

A method and apparatus for operating a microwave heating apparatus includes a microwave source adapted to feed microwaves to a cavity via a transmission line, including measuring a power of microwaves transmitted from the microwave source to the cavity, receiving operational data indicative of the power supplied to the microwave source, and adjusting at least one of an impedance of the transmission line or the impedance matching between the microwave source and the transmission line based on the measured power of the transmitted microwaves and the received operational data.

19 Claims, 3 Drawing Sheets

(51) Int. Cl.
*H05H 1/46* (2006.01)
*H05B 6/70* (2006.01)

(58) Field of Classification Search
CPC .............. Y02B 40/143; H01J 37/32229; H01J 37/32357; H01J 37/32266
USPC ................. 219/702, 690, 694, 695, 696; 118/723 MW, 723 ME, 723; 156/345, 156/643
See application file for complete search history.

(56) References Cited

U.S. PATENT DOCUMENTS

| | | | | |
|---|---|---|---|---|
| 5,038,713 | A | * | 8/1991 | Kawakami .......... H01J 7/32357 118/723 MA |
| 6,067,475 | A | | 5/2000 | Graves et al. |
| 6,080,270 | A | | 6/2000 | Tabrez et al. |
| 6,184,611 | B1 | | 2/2001 | Saito et al. |
| 2002/0027135 | A1 | | 3/2002 | Fagrell |
| 2009/0041640 | A1 | | 2/2009 | Kasai et al. |
| 2013/0334216 | A1 | * | 12/2013 | Carlsson ................ H05B 6/705 219/709 |

FOREIGN PATENT DOCUMENTS

| | | |
|---|---|---|
| EP | 2200402 A1 | 6/2010 |
| JP | 57192266 | 11/1982 |
| WO | 200052970 A1 | 9/2000 |

\* cited by examiner

CONTROL OF MICROWAVE SOURCE EFFICIENCY IN A MICROWAVE HEATING APPARATUS

CROSS-REFERENCE TO RELATED APPLICATION

The application is a continuation of U.S. application Ser. No. 13/331,959 filed Dec. 20, 2011, which claims priority to European Application No. EP10196108.4, filed on Dec. 21, 2010, entitled CONTROL OF MICROWAVE SOURCE EFFICIENCY IN A MICROWAVE HEATING APPARATUS, the disclosures of which are hereby incorporated by reference in its entirety.

BACKGROUND

The art of microwave heating involves feeding of microwave energy into a cavity. There are many aspects to consider when heating a load in the form of food by means of a microwave oven. Some of these aspects may be related to the heating itself wherein it is generally desired to obtain a uniform heating of the food at the same time as a maximum amount of available microwave power is absorbed in the food (to achieve a satisfactory degree of heating efficiency). However, there may also be other aspects related to e.g. energy consumption of the microwave oven, wherein an optimization (or improvement) of the overall efficiency of the microwave oven is desired. For this purpose, various types of power regulation of the microwave source have been suggested in prior art microwave ovens to improve efficiency.

For example, in a traditional microwave oven equipped with a regular high-voltage transformer for supplying a magnetron, power regulation of the magnetron is often accomplished via the use of duty-cycle operation, wherein the magnetron is alternatively turned on and off during periods as defined by the duty-cycle. In such microwave ovens, the magnetron is always operated at full power (usually a fixed large average anode current) and the average power of microwaves supplied to a cavity of the microwave oven is regulated by feeding microwaves using a certain percentage of a predefined time base during which the magnetron is oscillating. As another example, in a microwave oven equipped with an inverter connected to the magnetron, power regulation can be accomplished by supplying the magnetron with intermediate average anode currents, i.e. the magnetron is not necessarily operated at full power and there is no need of a duty-cycle. In both cases, however, the microwave ovens are often designed and optimized for heating of a standard 1000 g water load while the magnetron is at full power (normally 1000 W). As a result, prior art microwave ovens still suffer from a reduced overall efficiency if the load differs from the 1000 g water load or, if for a 1000 g water load, the oven (in particular provided with an inverter) is not operated at a full power level.

Thus, there is a need for providing new methods and new apparatuses that would address at least some of the above mentioned issues.

SUMMARY OF THE INVENTION

Generally, it is an object of the present invention to provide a microwave heating apparatus with an improved overall efficiency and, in particular, an improved control of the microwave source efficiency.

This and other objects of the present invention are achieved by means of a method and a microwave heating apparatus having the features defined in the independent claims. Preferable embodiments of the invention are characterized by the dependent claims.

Hence, according to a first aspect of the present invention, a method of operating a microwave heating apparatus comprising a microwave source adapted to feed microwaves to a cavity via a transmission line is provided. The method comprises the steps of measuring the power of microwaves transmitted from the microwave source to the cavity and receiving operational data indicative of the power supplied to the microwave source. The impedance of the transmission line and/or the impedance matching between the microwave source and the transmission line is then adjusted based on the measured power of the transmitted microwaves and the received operational data in order to control the efficiency of the microwave source.

According to a second aspect of the present invention, a microwave heating apparatus is provided. The microwave heating apparatus comprises a microwave source for generating microwaves, a transmission line for transmitting the generated microwaves from the microwave source to a cavity, measuring means for measuring the power of microwaves transmitted from the microwave source and receiving means for receiving operational data indicative of the power supplied to the microwave source. The microwave heating apparatus further comprises a control unit adapted to adjust the impedance of the transmission line and/or the impedance matching between the microwave source and the transmission line based on the measured power of the transmitted microwaves and the received operational data in order to control the efficiency of the microwave source.

The present invention makes use of an understanding that the impedance of the transmission line and/or the impedance matching between the microwave source and the transmission line may be adjusted in order to control the efficiency of the microwave source. For this purpose, the efficiency of the microwave source may be evaluated or determined based on measurement, or monitoring, of the power level of the microwaves transmitted (in the transmission line) from the microwave source to the cavity and based on operational data indicative of the power supplied to the microwave source. The efficiency of the microwave source may then be controlled by adjusting the impedance matching between the microwave source and the transmission line and/or the impedance of the transmission line via which the microwaves are transmitted from the microwave source to the cavity. Advantageously, the impedance of the transmission line and/or the impedance matching between the microwave source and the transmission line may be adjusted such that the power level of the microwaves transmitted from the microwave source to the cavity is increased, thereby increasing the efficiency of the microwave source (i.e. operating the magnetron, if the microwave source is a magnetron, in the so-called sink phase). However, in some cases, the impedance of the transmission line and/or the impedance matching between the microwave source and the transmission line may be adjusted such that the power level of the microwaves transmitted from the microwave source to the cavity is decreased, thereby decreasing the efficiency of the microwave source (i.e. operating the magnetron, if the microwave source is a magnetron, in anti-sink phase). The present invention is thus advantageous in that it provides a microwave heating apparatus with improved control of the microwave source efficiency. Further, an improved control of the microwave source efficiency contributes positively to the overall energy efficiency of the microwave heating apparatus as a whole.

The present invention is particularly advantageous in that the efficiency of the microwave source may be controlled depending on dynamical changes occurring in the microwave heating apparatus. Indeed, the efficiency of the microwave source is dependent on the impedance of a system defined by the microwave source, the transmission line and the cavity. In its turn, the impedance of such a system is dependent on a number of parameters such as the form, size and phase of a load arranged in the cavity, the form and size of the transmission line and the form and size of the cavity. In particular, the impedance may vary because of a change in size, form or phase of the load like at a transformation from frozen to thawed (due to the microwave heating). With the present invention, by adjusting the impedance of the transmission line and/or the impedance matching between the microwave source and the transmission line, it is thus possible to control the efficiency of the microwave source while taking into account any changes occurring in the load (change in size/geometry or change in temperature which alters the dielectric data of the load). Similarly, with the present invention, it is possible to account for changes occurring in the microwave source, e.g. a magnetron, such as a change of the anode current or a change in temperature.

The present invention is also advantageous in that the efficiency of the microwave source, in particular a magnetron (but also for other types of microwave sources), can automatically be kept at a certain level of efficiency, and preferably in the sink phase, during operation of the microwave heating apparatus. Indeed, the efficiency of the microwave source can be controlled during operation by adjusting or tuning the impedance of the transmission line (and/or the impedance matching between the microwave source and the transmission line, also referred to as impedance adjustments in the following) independently of what has influenced the need for an adjustment (in particular an increase) of the efficiency of the microwave source. The efficiency of the microwave source may be kept at a high level by dynamic impedance adjustments.

The present invention is also advantageous in that the microwave heating apparatus can operate at optimal (or at least improved) conditions independently of the load arranged in the cavity (and in particular not only for a standard 1000 g water load). Indeed, as compared to prior art microwave ovens in which the impedance is tuned so as to have sink phase operation for large loads, normally a standard 1000 g water load, the microwave heating apparatus of the present invention is more flexible. In the present invention, sink phase operation for the magnetron may be obtained in principle for any kind of load sizes (or weights) and at least for other (smaller) loads than the standard load normally used for design of microwave ovens. In prior art microwave ovens, if a load is different, and in particular smaller, than the standard load, the efficiency of the microwave source is often not optimal.

In addition, the present invention is advantageous in that it provides a microwave heating apparatus and a method of operating a microwave heating apparatus with reduced energy consumption since the magnetron may be controlled to operate in the sink phase, i.e. at a high efficiency, and an improved overall efficiency of the microwave heating apparatus is obtained.

As mentioned above, the microwave source may be a magnetron such as e.g. a mains voltage transformer powered magnetron or an inverter-powered magnetron.

According to an embodiment, the method may further comprise the step of measuring the power of microwaves reflected back towards the microwave source. For this purpose, the microwave heating apparatus may further comprise additional measuring means for measuring the power of the reflected microwaves. In the present embodiment, the efficiency of the microwave source may be controlled based on both the power level of the microwaves transmitted from the microwave source to the cavity and the power level of the microwaves reflected back towards the microwave source. The power level of the reflected microwaves is generally representative of the amount of microwaves absorbed by the cavity and, in particular, a load arranged in the cavity. The present embodiment is thus advantageous in that the impedance of the transmission line and/or the impedance matching between the microwave source and the transmission line may be adjusted with respect to both the efficiency of the microwave source and the heating efficiency of the microwave heating apparatus.

It will be appreciated that the additional measuring means may be provided as an additional function of the measuring means adapted to measure the power of the transmitted microwaves or as a separate unit specifically dedicated to the measurement of the power level of the reflected microwaves. For example, the measuring means and the additional measuring means may be a directional coupler, i.e. a single entity, adapted to separately measure the power of the transmitted microwaves and the power of the reflected microwaves.

According to an embodiment, the impedance of the transmission line and/or the impedance matching between the microwave source and the transmission line may be adjusted by moving, within the transmission line, at least one element of the group including a slug tuner (i.e. a pin projecting into the transmission line), a motor driven slug tuner, a plunger and a motor driven plunger. A plunger enables a change of the geometry or length of the transmission line (e.g. via a movable end or wall of the transmission line), thereby adjusting the impedance of the transmission line and, in particular, the impedance matching between the microwave source and the transmission line. A plunger may preferably include a quarter-wave choke (or seal). The movable element may also be designed to be a matching element adapted to match or mismatch, depending on the desired control, the impedance between the microwave source and the transmission line. Such movable elements or matching elements may be impedance transformers that have the capability of introducing a variable shunt susceptance into the transmission line. A slug tuner or plunger may e.g. be implemented as a (longitudinally) adjustable or movable piece of metal arranged at a wall of the transmission line or into the transmission line. Advantageously, the movable element may be motor-driven such that an automatic impedance adjustment, and thereby an automatic control of the microwave source efficiency, is obtained.

In particular, if the movable element is a plunger, the movable element may advantageously be arranged in proximity to the magnetron (or an antenna of the microwave source) since its effect on the impedance then becomes even more increased and, in addition, it strongly influences the magnetron-to-waveguide matching. On the other hand, a slug tuner may advantageously be arranged at a certain distance (normally in the order of about half to one wavelength of the microwaves) from the microwave source. The desired distance between the slug tuner and the magnetron may be selected to reduce the likelihood for propagation of evanescent modes or higher order modes present locally around the magnetron antenna.

To further illustrate how the impedance may be adjusted, considering a tubular (e.g. with a rectangular cross section) waveguide wherein the microwave source is arranged at a first extremity, or end, of such a waveguide and the cavity, or a feeding port of the cavity, is arranged at an opposite (second) extremity of the waveguide, the movable element may be arranged at the extremity corresponding to the microwave source. For example, this extremity may be replaced, or equipped, with a movable plug (or plunger) having about the same cross section as the waveguide such that if the distance between the movable plug and the microwave source (or antenna of the microwave source) varies, the coupling between the magnetron and the waveguide varies. Thus, the magnetron's efficiency may be adjusted by moving the plunger, which effectively changes the overall system impedance.

According to an embodiment, the impedance of the transmission line and/or the impedance matching between the microwave source and the transmission line may be adjusted such that the efficiency of the microwave source is increased or maximized if the measured power of the reflected microwaves is below a predetermined threshold. Further, the impedance of the transmission line and/or the impedance matching between the microwave source and the transmission line may be adjusted such that the efficiency of the microwave source is decreased or minimized if the measured power of the reflected microwaves is above the predetermined threshold. The present embodiment is advantageous in that it provides a safe manner of operating the microwave heating apparatus (and thereby controlling the efficiency of the microwave source) in that, on the one hand, the efficiency of the microwave source may be increased on a condition that the power level of reflected microwaves remains under a predetermined threshold, and, on the other hand, the efficiency of the microwave source may be decreased if the power level of the reflected microwaves is above the predetermined threshold. Indeed, an increase of the efficiency of the microwave source while the power level of the reflected microwaves has reached the predetermined threshold would deteriorate the microwave source as the amount of microwaves reflected back to the microwave source is already too high. Thus, even if the magnetron operates in anti-sink phase, the impedance is advantageously not adjusted to make the magnetron operate in sink phase if the reflection is too high.

For example, for a magnetron equipped with a ceramic window, although it normally can withstand a significant amount of reflected microwaves, if the amount of reflected microwaves is very high in anti-sink phase (also called the thermal region due to poor efficiency and high anode current), the very large temperature derivative may in fact lead to a crack in the ceramic window (mainly because of the difference in thermal expansion coefficient between the metallic magnetron's antenna and the ceramic window). On the other hand, a very high reflection in the sink phase usually results in reduced oscillation stability and/or antenna to waveguide flashover.

The power level measured for the reflected microwaves may therefore determine how the microwave source is to be controlled and, in particular, whether the efficiency of the microwave source is to be increased. The predetermined threshold may be selected with respect to an amount of reflected microwaves that the microwave source of the microwave heating apparatus can withstand. Advantageously, the efficiency of the microwave source is increased as long as the power level of the reflected microwaves is below the predetermined threshold. If the power level of the reflected microwaves is above the predetermined threshold, the efficiency of the microwave source (and thereby the amount of microwaves transmitted to the cavity) is decreased, i.e. leaving the sink phase (in case the microwave source was already operated in the sink phase), which is advantageous due to the risk for moding and/or arcing if the reflection is very high (i.e. above the threshold).

In particular, the impedance of the transmission line and/or the impedance matching between the microwave source and the transmission line may be adjusted as a function of the ratio between the measured power of the transmitted microwaves and the power supplied to the microwave source. More specifically, if the microwave source is a magnetron, the operational data is the anode current of the magnetron. In such a case, the impedance of the transmission line and/or the impedance matching between the microwave source and the transmission line may be adjusted as a function of the ratio between the measured power of the transmitted microwaves and the anode current, wherein a high ratio (and in particular the highest ratio) corresponds to a high efficiency of the microwave source (i.e. the sink phase) and a low or lower ratio correspond to a low or lower efficiency (i.e. the anti-sink phase).

According to an embodiment, the microwave source may be turned off if the measured power of the reflected microwaves is above a second predetermined threshold or security threshold, which is advantageous in that it further improves the life-time of the microwave source. Advantageously, the security threshold is at a level above the above mentioned (first) predetermined threshold such that, if the power level of the reflected microwaves has (suddenly) reached or is above the security threshold, the control unit of the microwave heating apparatus will not attempt to initiate a decrease of the efficiency of the microwave source by impedance adjustment (which may require some time) but, instead, immediately shut down or turn off the microwave source. It will be appreciated that the present embodiment is advantageous both if the magnetron is operated in the anti-sink phase or in the sink phase. In other words, the measured power of the reflected microwaves is preferably monitored even if the system is tuned for sink phase oscillation.

Further objectives of, features of, and advantages with, the present invention will become apparent when studying the following detailed disclosure, the drawings and the appended claims. Those skilled in the art will realize that different features of the present invention can be combined to create embodiments other than those described in the following.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

Figure 1:
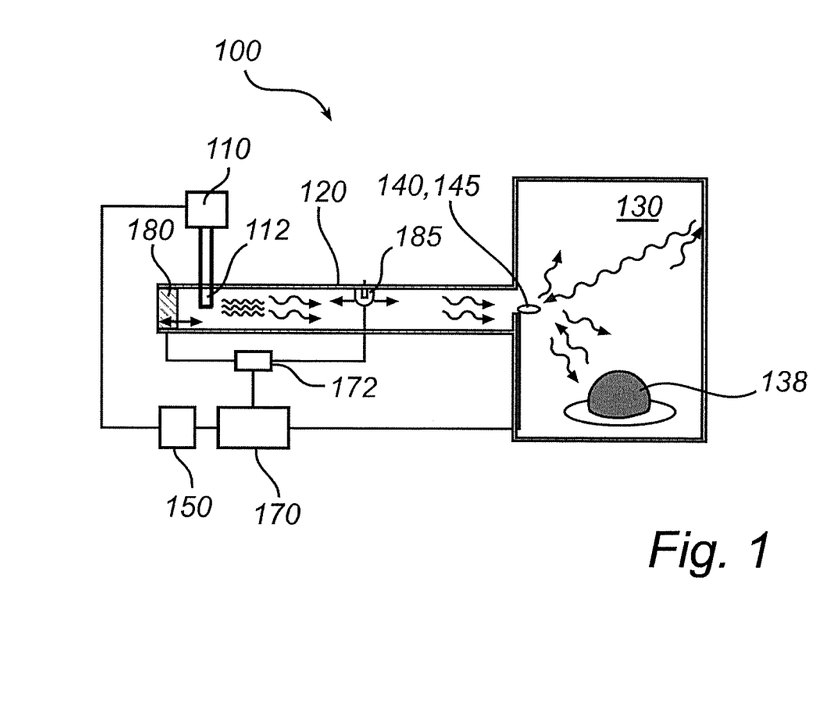
FIG. 1 schematically shows a microwave heating apparatus according to an embodiment of the present invention.

With reference to FIG. 1, there is shown a schematic view of a microwave heating apparatus according to an embodiment of the present invention.

The microwave heating apparatus 100 comprises a microwave source 110 (e.g. a magnetron), a transmission line 120 and a cavity 130. The microwave source 110 is arranged at a first end, or extremity, of the transmission line 120 while the cavity 130 is arranged at a second end, opposite to the first end, of the transmission line 120. The microwave source 110 is adapted to generate microwaves, e.g. via an antenna 112, and the transmission line 120 is configured to transmit the generated microwaves from the (antenna 112 of the) microwave source 110 to the cavity 130.

The transmission line 120 may also be equipped with a movable element, namely a plunger 180, arranged at the extremity of the transmission line 120 which is closest to the microwave source 110. The plunger 180 is movable such that its position may vary in the transmission line 120, thereby varying the impedance matching between the microwave source 110 and the transmission line 120. As depicted in FIG. 1, the antenna 112 of the microwave source 110 is inserted into the transmission line or waveguide 120 such that its extremity is at a certain position between the waveguide back shorting wall close to the microwave source and the end of the waveguide connecting to the cavity 130, usually at a distance of about 18-26 mm from the back shorting wall. The back shorting wall of the waveguide 120 closest to the microwave source is the wall that is preferably used as the plunger wall. In FIG. 1, the plunger 180 acts as the lateral shorting wall of the transmission line 120.

Alternatively, or in addition, the transmission line 120 may also be equipped with further movable element such as a post or pin 185 arranged at a wall of the transmission line 120, preferably one of the broadest wall in the case of a rectangular waveguide (wherein the movable element is inserted in the transmission line 120 via a slot for sliding the pin back and forth). The slot(s) are also preferably symmetric in order to reduce any potential microwave leakage (some choking might be needed). The post 185 extends in the transmission line 120 and is movable such that its displacement can alter the impedance of the transmission line 120. It will be appreciated that both the lateral position of the movable element 185 along a wall of the transmission line 120 and the penetration depth of the movable element 185 in the transmission line 120 may be adjusted.

The movable elements, such as the plunger 180 and the post 185, may be controlled by a control unit 170 via e.g. an intermediate "servo" unit 172. In particular, the servo-unit 172 may be connected to a motor (not shown) associated with the plunger 180 and another motor (not shown) associated with the post 185 such that the plunger 180 or the post 180 may be automatically moved in accordance with instructions received from the control unit 170.

The control unit 170 may determine the need of impedance adjustment and the level of impedance adjustment (e.g. a displacement of any one or both of the movable elements 180 and 185) based on the power level of the microwaves transmitted from the microwave source 110 to the cavity 130 and operational data indicative of the power supplied to the microwave source 110. For this purpose, the control unit 170 may be connected to a measuring means 140 adapted to measure the power of the transmitted microwaves and a receiving means 150 adapted to receive the operational data.

In accordance with the present invention, the impedance of the transmission line 120 and/or the impedance matching between the microwave source 110 and the transmission line 120 is adjusted in order to control the efficiency of the microwave source 110. Thus, if based on the power level of the transmitted microwaves measured at the measuring means 140 and the operational data received at the receiving means 150, it is determined that the efficiency of the microwave source 110 is not optimal (which may either be that the magnetron 110 operates in the sink phase while the anti-sink phase would be preferred or vice versa), the control unit 170 is then configured to adjust the impedance of the transmission line 120 and/or the impedance matching between the microwave source 110 and the transmission line 120.

Normally, the control unit 170 is configured to optimize, or at least increase, the efficiency of the microwave source 110. Thus, if because of a change in e.g. the geometry of a load 138 arranged in the cavity 130, it is determined that the efficiency of the microwave source 110 has decreased since the preceding measurement (i.e. the last measurement) of the power level of the transmitted microwaves, the control unit 170 may be configured to adjust the impedance of the transmission line 120 and/or the impedance matching between the microwave source 110 and the transmission line 120 such that the efficiency of the microwave source 110 is increased. For example, the control unit 170 may send instructions to the servo-unit 172 to displace or move at least one of the movable elements 180 and 185 in the transmission line 120, thereby altering the impedance of the transmission line 120 and/or the magnetron to waveguide matching. However, in other circumstances, as will be further described in the following, the control unit 170 may also be configured to decrease the efficiency of the microwave source 110.

Alternatively, if it is determined by the control unit 170 that the impedance of the transmission line 120 and/or the impedance matching between the microwave source 110 and the transmission line 120 is to be adjusted, the movable elements 180 and 185 may be directly activated. In other words, the functions of the servo-unit 172 controlling a motor, or indicating an amount of displacement by which a movable element is to be moved, may be integrated in the movable element itself. In such a case, a direct connection between the control unit 170 and the movable elements 180 and 185 may be established.

Although the various connections between the control unit 170, the servo-unit 172, the receiving means 150, the measuring means 140 and the movable elements 180 and 185 are represented by continuous lines in FIG. 1, it will be appreciated that these connections may be either wire connections or wireless connections (e.g. using RF signals).

According to an embodiment, the microwave heating apparatus 100 may comprise additional measuring means 145 configured to measure the power level of microwaves reflected back towards the microwave source 110. In FIG. 1, the measuring means 140 and the additional measuring means 145 are integrated in a single entity. Generally, microwaves transmitted to a cavity may be either absorbed by a load arranged in the cavity, absorbed by elements of the cavity (or other objects present in the cavity), or reflected back from the cavity (or feeding port). Indeed, if the coupling to the cavity 130 is not perfect, some microwave power may be reflected, e.g. through a feeding port, back into the transmission line 120 towards the microwave source 110. An advantageous, and thus preferred, way to control whether there is a satisfactory coupling to the cavity 130, is by measuring the power that is reflected from a feeding port of the cavity 130. In the example schematically shown in FIG. 1, the power of the reflected microwaves may be measured at the extremity of the transmission line 120 which is closest to the cavity 130. The powers of the reflected microwaves are, at least partly, representative of the amount of microwaves absorbed by the load 138 arranged in the cavity 130.

The control unit 170 may then be configured to adjust the impedance of the transmission line 120 and/or the impedance matching between the microwave source 110 and the transmission line 120 such that the efficiency of the microwave source 110 is increased or maximized if the power of the reflected microwaves is below a predetermined threshold. The measured power level of reflected microwaves represents an amount of microwaves absorbed by the cavity (and thus the load) such that, if the amount of reflected microwaves is below the predetermined threshold, the load impedance is not completely suitable to the transmission line impedance. As a result, the amount of microwaves transmitted to the cavity may be increased. The predetermined threshold may be selected such that it represents an amount of microwaves that is relatively high but, still, that the microwave source 110 can withstand, which is advantageous in that it provides some kind of protection for the microwave source 110, thereby increasing its lifetime.

In particular, the control unit 170 may be configured to turn off the microwave source if the power level of the reflected microwaves measured at the additional measuring unit 145 exceeds a second predetermined threshold, namely a security threshold. The security threshold may be selected such that it represents an amount of microwaves that is slightly below an amount of microwaves that the microwave source could not withstand, thereby avoiding (or at least limiting the risk of) any serious deterioration of the microwave source 110.

According to an embodiment, the impedance of the transmission line 120 and/or the impedance matching between the microwave source 110 and the transmission line 120 may be adjusted as a function of the ratio between the measured power of the transmitted microwaves and the power supplied to the microwave source 110, which ratio is representative of the efficiency of the microwave source 110. In particular, if the microwave source is a magnetron, the impedance of the transmission line 120 and/or the impedance matching between the microwave source 110 and the transmission line 120 may be adjusted as a function of the ratio between the measured power of the transmitted microwaves and the anode current of the magnetron (wherein the anode current is representative of the power supplied to the magnetron 110). It will be appreciated that for microwave ovens provided with inverters for controlling the anode current of the magnetron, such information may be directly obtained, normally via the inverter, by the control unit. However, it is also contemplated to apply the present invention to microwave ovens not comprising any inverter and for which the anode current may be derived via e.g. an external current meter. Measurements of the anode current in microwave ovens provided with regular high voltage transformers is preferably performed "outside" the tube of the magnetron itself, e.g. in the supply circuit.

In particular, in microwave ovens, the frequency of the microwaves varies as a function of the anode current (or as a function of a current from some power supply connected to the magnetron). Thus, if the anode current varies (for any reasons such as a change in output power from e.g. 900 W to 400 W), the oscillating frequency of the magnetron may vary (also refers to as the pushing factor), which may affect the efficiency of the magnetron. As the oscillation frequency is changed, the microwave source may then operate in sink phase without the need for retuning the impedance/source matching. The pushing factor (i.e. a change in oscillating frequency because of a change in the average anode current) may make the magnetron operate in anti-sink phase so that a mechanical adjustment of e.g. a plunger is needed or in sink phase such that no impedance adjustment is needed. The present invention takes care of the pushing factor in that the need for impedance adjustment is based on the power level of the transmitted microwaves and the anode current.

Turning again to the above example, changing the output power level from 900 W to 400 W may for instance lead to a change from sink phase to anti-sink phase. The microwave heating apparatus according to the present invention may then be configured to determine whether the impedance of the transmission line and/or the impedance matching between the microwave source and the transmission line needs to be adjusted in order to control the efficiency of the magnetron. The efficiency of the magnetron may e.g. be regulated with respect to a preferred (or maximal) value of the ratio between the power level of the transmitted microwaves and the anode current. Alternatively, as mentioned above, the efficiency of the magnetron may be increased or decreased with respect to a predetermined threshold for the power level of the reflected microwaves.

Figure 2:
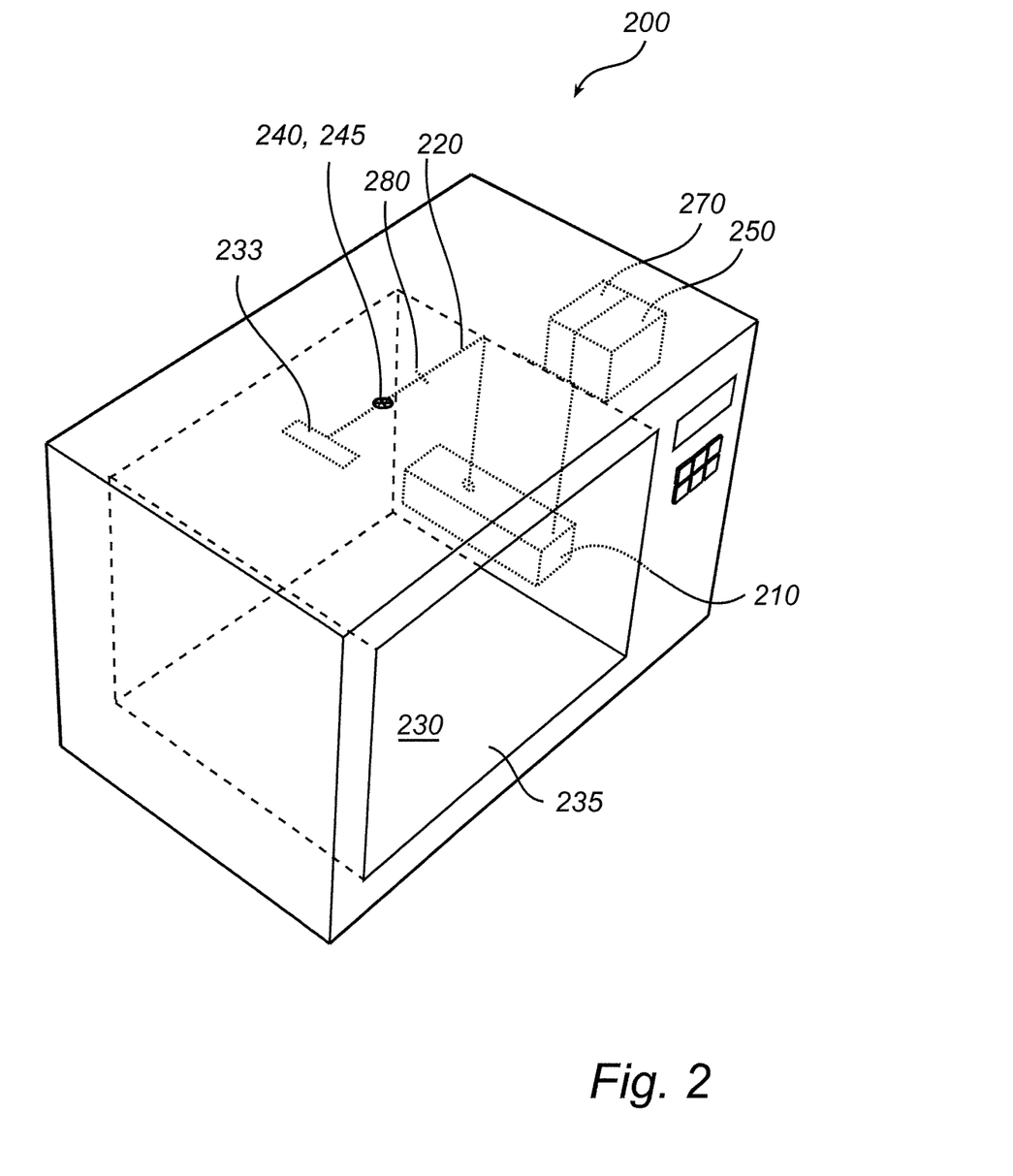
FIG. 2 schematically shows a microwave heating apparatus according to another embodiment of the present invention.

With reference to FIG. 2, there is shown a microwave heating apparatus 200, e.g. a microwave oven, having features and functions according to another embodiment of the present invention.

The microwave oven 200 comprises a cavity 230 defined by an enclosing surface. One of the side walls of the cavity 230 may be equipped with a door 235 for enabling the introduction of a load, e.g. food, in the cavity 230. Further, the cavity 230 may be provided with a feeding port (or antenna) 233 through which microwaves are fed to the cavity 230 of the microwave oven 200. The feeding port may for instance be an antenna, such as a patch antenna or a H-loop antenna, or even an aperture in a wall (including sidewalls, the bottom and the ceiling) of the cavity 230. In the following, reference is made to the term "feeding port".

The microwave oven 200 further comprises a microwave source 210, e.g. a magnetron, connected to the feeding port 233 of the cavity 230 by means of a transmission line or waveguide 220. The transmission line 220 may for instance be a coaxial cable. The transmission line 220 may comprise a plurality of movable elements 280, such as those described above with reference to FIG. 1, for adjusting the impedance of the transmission line 220 and/or the impedance matching between the microwave source 210 and the transmission line 220.

Further, the microwave oven 200 comprises a first measuring unit (or measuring means) 240 for obtaining, or being adapted to obtain, a signal representative of the power transmitted from the microwave source 210.

Further, the microwave oven 200 may also comprise a second measuring unit (or measuring means) 245 for obtaining, or being adapted to obtain, a signal representative of the reflected microwaves from the cavity 230 at the feeding port 233. Both the first and the second measuring means 240 and 245 may be arranged at the feeding port 233.

Further, the microwave oven 200 comprises a receiving means 250 adapted to receive operational data (i.e. information) indicative of the power supplied to the microwave source 210.

Further, the microwave oven 200 comprises a control unit 270 operatively connected to the first measuring unit 240, the second measuring unit 245 and the receiving means 250. The result of the measurement performed by the first measuring unit 240, the second measuring unit 245 and the information received by the receiving means 250 are transmitted to the control means or unit 270. The control unit 270 is then configured to adjust the impedance of the transmission line 220 and/or the impedance matching between the microwave source 210 and the transmission line 220 based on the measured power of the transmitted microwaves, the received operational data and, optionally, the measured power of the reflected microwaves.

Either one, or both, of the first measuring unit 240 and the second measuring unit 245 may be integrated as sub-units in the control unit 270. Alternatively, the measuring units 240 and 245 may be arranged as separate units connected to the control unit 270. The sensing part(s) of the first measuring unit 240 and the second measuring unit 245 may be a probe comprising a field-sensor at its extremity for sensing the energy transmitted to or reflected from the cavity, respectively. As another example, the first measuring unit 240 and the second measuring unit 245 may be a directional coupler arranged in proximity to the feeding port 233 and in proximity to, or in connection with, the transmission line 220 connecting the microwave source 210 with the feeding port 233.

It will be appreciated that the receiving means 250, although it is represented as a separate entity in FIG. 2, may be an integrated part of either one of the microwave source 210 or the control unit 270.

Further, the respective powers of the transmitted, and optionally the reflected, microwaves may be measured by the measuring units 240 and 245 at various time points during an operation cycle (for instance used for heating a load arranged in the cavity) of the microwave heating apparatus 200 and the impedance of the transmission line 220 adjusted in accordance with any one of the above described embodiments. It is therefore contemplated that the first and second measuring units 240 and 245 may be adapted to, continuously or periodically, monitor the signals representative of the powers of the transmitted and reflected microwaves in order to dynamically (i.e., during an operation cycle) control the efficiency of the microwave source 210. For the synchronization of the power measurements in relation to, or within, the operation cycle, the microwave oven 200 may further comprise a clock system (not shown in FIG. 1 but in FIG. 3).

Any of the embodiments described above with reference to FIG. 1 for controlling the efficiency of the microwave source 110 is applicable to the microwave heating apparatus described with reference to FIG. 2.

Figure 3:
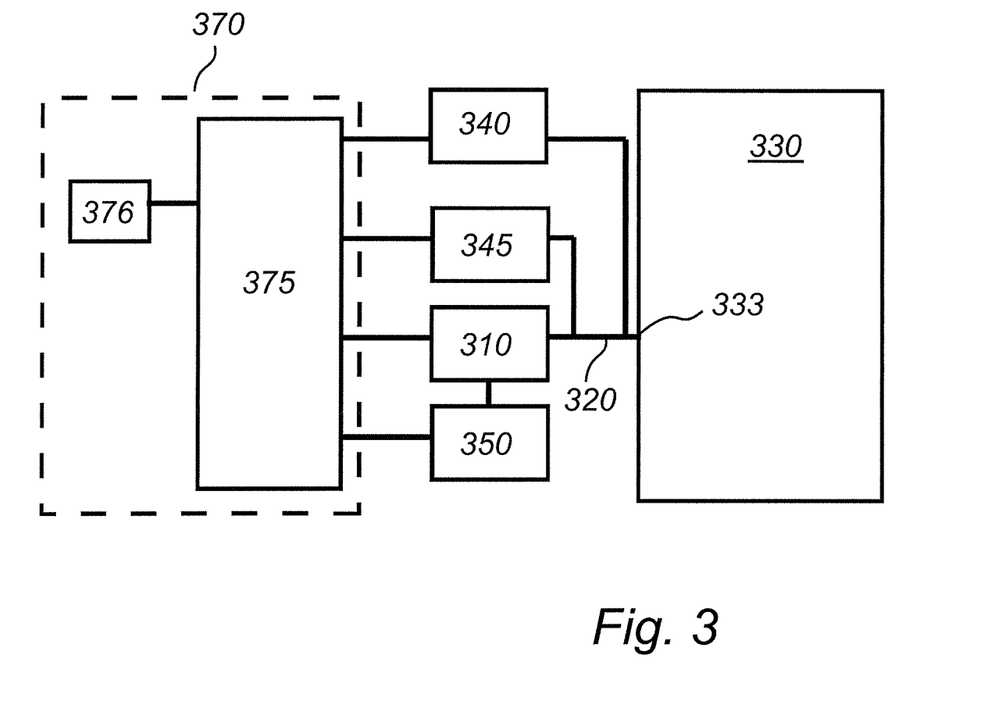
FIG. 3 shows a block diagram illustrating the general functions of a microwave heating apparatus according to an embodiment of the present invention.

The general function of a microwave heating apparatus, e.g. a microwave oven, according to an embodiment of the present invention is further illustrated in FIG. 3 in the form of a block diagram.

A microwave generator 310 feed microwaves to a cavity 330 via a transmission line 320 and a feeding port 333. The signals representative of the power of the transmitted microwaves are obtained by a first measuring unit 340 and are then transmitted to a control unit 370. Operational data indicative of the power supplied to the microwave generator 310 is received by a receiving means 350 and then transmitted to the control unit 370. The control unit 370 may comprise a processor or processing means 375 for analyzing the signal obtained from the first measuring means 340 and the operational data received from the receiving means 350.

Further, the microwave heating apparatus may comprise an additional measuring means 345 for measuring the power of the microwaves reflected back towards the microwave generator 310. The signal representative of the power of the reflected microwaves is then transmitted to the control unit 370.

Based on the signals received from the first measuring means 340, the additional measuring means 345, and the operational data received from the receiving means 350, the control unit 370 is configured to control the efficiency of the microwave generator 310 by adjustment of the impedance in the transmission line 320 and/or the impedance matching between the microwave generator 310 and the transmission line 320.

As mentioned above in connection to FIG. 2, the control unit 370 may further comprise a clock system 376 for synchronizing the period of measurements and the period during which the impedance is being adjusted.

The first and second measuring units 340 and 345 and the control unit 370 may be configured to operate in a similar manner as the first measuring means 140 and 240, the second measuring units 145 and 245, and the control units 170 and 270 described above with reference to FIGS. 1 and 2, respectively.

Figure 4:
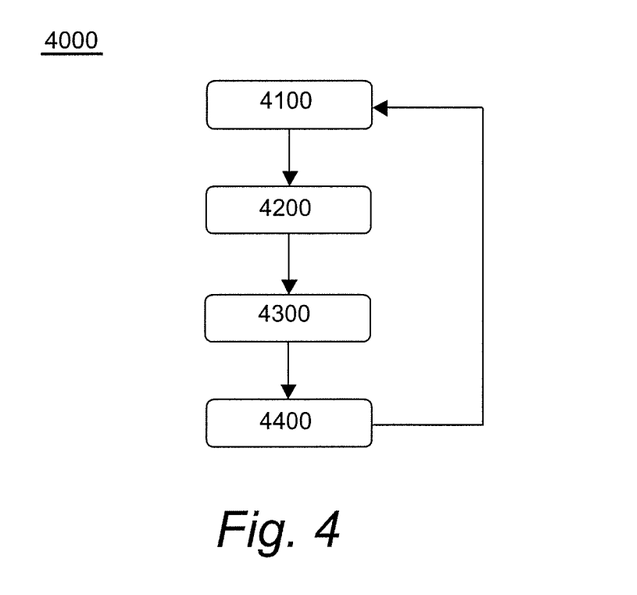
FIG. 4 is a general outline of a method of operating a microwave heating apparatus in accordance with an embodiment of the present invention.

With reference to FIG. 4, a method of operating a microwave heating apparatus comprising a microwave source adapted to feed microwaves to a cavity via a transmission line is described in accordance with an embodiment of the present invention.

The method comprises the step of measuring 4100 the power of microwaves transmitted from the microwave source to the cavity and the step of receiving 4200 operational data indicative of the power supplied to the microwave source. Optionally, the method comprises also the step of measuring 4300 the power of microwaves reflected back towards the microwave source. The method then comprises the step of adjusting 4400 the impedance of the transmission line and/or the impedance matching between the microwave source and the transmission line based on the measured power of the transmitted microwaves and the received operational data in order to control the efficiency of the microwave source.

According to an embodiment, the impedance adjustment(s) at step 4400 includes moving of at least one element within the transmission line. Once the movable element has been displaced, the power measurements performed at steps 4100 and 4300 for measuring the power level of the transmitted microwaves and the power level of the reflected microwaves, respectively, may be repeated, as indicated in FIG. 4. In this manner, a continuous regulation of the efficiency of the microwave source is provided.

It will be appreciated that the measurements and the adjustment of the impedance are advantageously performed at a sufficient rate such that the magnetron efficiency in principle remains unaffected of changes, e.g. thermal changes, in either the load or the magnetron itself.

Further, it will be appreciated that any one of the embodiments described above with reference to FIGS. 1-3 is combinable and applicable to the method described herein with reference to FIG. 4.

The present invention is applicable for domestic appliances such as a microwave oven using microwaves for heating. The present invention is also applicable for larger industrial appliances found in e.g. food operation. The present invention is also applicable for vending machines or any other dedicated applicators.

While specific embodiments have been described, the skilled person will understand that various modifications and alterations are conceivable within the scope as defined in the appended claims.

For example, although the microwave ovens 100 and 200 described with reference to FIGS. 1 and 2 have a rectangular enclosing surface, it will be appreciated that, in the present invention, the cavity of the microwave oven is not limited to such a shape and may, for instance, have a circular cross section.

For example, the steps of the method described with reference to FIG. 4 may be performed in another order than that described above, in particular for steps 4100-4300.

It will be appreciated that the present invention is not limited to any specific range of frequencies for operation of the microwave heating apparatus. The present invention is therefore applicable for any standard microwave sources having mid-band frequencies of 915 MHz, 2450 MHz, 5800 MHz and 22.125 GHz.

Further, it will be appreciated that the present invention is not limited to a microwave source being a magnetron. The microwave source may for example be a solid state microwave generator (or semiconductor-based microwave generator) including e.g. a varactor diode (having a voltage-controlled capacitance).

Although a microwave heating apparatus comprising a single microwave source is described in the present application, it will be appreciated that the present invention may also be applied to a microwave heating apparatus comprising a plurality of microwave sources wherein each of the microwave source is associated with a dedicated transmission line and dedicated feeding port such that the power of the microwaves transmitted from each of the microwave sources and, optionally, the power of the microwaves reflected to each one of the microwave sources can be separately monitored (while reducing any crosstalk disturbance). In particular, the feeding ports may be arranged to provide an orthogonal feeding of the microwaves in the cavity.

What is claimed is:

1. A method of operating a cycle of operation of a microwave heating apparatus for heating a food load, comprising a microwave source adapted to feed microwaves to a cavity via a transmission line, the method comprising the steps of:
   measuring a power of microwaves transmitted from the microwave source to the cavity during the cycle of operation;
   receiving operational data indicative of the power supplied to the microwave source and indicative of at least one of a change in size of the food load, a change in form of the food load, or a change in phase of the food load; and
   adjusting at least one of an impedance of the transmission line or the impedance matching between the microwave source and the transmission line, during the cycle of operation, based on the measured power of the transmitted microwaves and the received operational data by moving, in the transmission line, a plunger element positioned proximate the microwave source in order to control an efficiency of the microwave source.

2. The method of claim 1 further comprising the step of measuring the power of microwaves reflected back towards the microwave source.

3. The method of claim 2, wherein the plunger element is a motor driven plunger.

4. The method of claim 2 further comprising the step of turning off the microwave source if the measured power of the reflected microwaves is above a security threshold.

5. The method of claim 1, wherein the plunger element is a motor driven plunger.

6. The method of claim 5 further comprising the step of turning off the microwave source if the measured power of reflected microwaves is above a security threshold.

7. The method of claim 1, wherein at least one of the impedance of the transmission line or the impedance matching between the microwave source and the transmission line is adjusted such that the efficiency of the microwave source is increased or maximized if the measured power of reflected microwaves is below a predetermined threshold and such that the efficiency of the microwave source is decreased or minimized if the measured power of reflected microwaves is above the predetermined threshold.

8. The method of claim 1, wherein at least one of the impedance of the transmission line or the impedance matching between the microwave source and the transmission line is adjusted as a function of the ratio between the measured power of the transmitted microwaves and the power supplied to the microwave source.

9. The method of claim 1 further comprising the step of turning off the microwave source if the measured power of reflected microwaves is above a security threshold.

10. The method of claim 1 wherein adjusting at least one of an impedance of the transmission line or the impedance matching between the microwave source and the transmission line is further based on a change in anode current or a change in temperature of the microwave source.

11. The method of claim 1, wherein receiving operational data is further indicative of a change of impedance during the cycle of operation.

12. A microwave heating apparatus comprising:
   a microwave source for generating microwaves during a cycle of operation on a food load;
   a transmission line for transmitting the generated microwaves from the microwave source to a cavity;
   a measuring device capable of measuring a power of microwaves transmitted from the microwave source during the cycle of operation;
   a receiving device capable of receiving operational data indicative of the power supplied to the microwave source and indicative of at least one of a change in size of the food load, a change in form of the food load, or a change in phase of the food load; and
   a control unit that adjusts at least one of an impedance of the transmission line or the impedance matching between the microwave source and the transmission line based on the measured power of the transmitted microwaves and the received operational data by moving, in the transmission line, a plunger element positioned proximate the microwave source in order to control an efficiency of the microwave source during the cycle of operation.

13. The microwave heating apparatus of claim 12 further comprising an additional measuring device that measures the power of microwaves reflected back towards the microwave source.

14. The microwave heating apparatus of claim 13, wherein the control unit is configured to adjust at least one of the impedance of the transmission line or the impedance matching between the microwave source and the transmission line such that the efficiency of the microwave source is increased or maximized if the measured power of the reflected microwaves is below a predetermined threshold and such that the efficiency of the microwave source is decreased or minimized if the measured power of the reflected microwaves is above the predetermined threshold.

15. The microwave heating apparatus of claim 13, wherein the control unit is configured to turn off the microwave source if the measured power of the reflected microwaves is above a security threshold.

16. The microwave heating apparatus of claim 13, wherein the control unit is configured to control the efficiency of the microwave source as a function of a ratio between the measured power of the transmitted microwaves and the power supplied to the microwave source.

17. The microwave heating apparatus of claim 16 further comprising a directional coupler adapted to measure the power of the transmitted microwaves and the power of the reflected microwaves.

18. The microwave heating apparatus of claim 17, wherein the microwave source is a magnetron and the operational data is an anode current of the magnetron.

19. The microwave heating apparatus of claim 12, wherein the plunger element is a motor driven plunger.

\* \* \* \* \*